June 12, 1951  A. M. YOUNG  2,556,892
WAFFLE IRON
Filed Oct. 14, 1949

Inventor:
Allan M. Young,
by
His Attorney.

Patented June 12, 1951

2,556,892

UNITED STATES PATENT OFFICE 2,556,892

WAFFLE IRON

Allan M. Young, Meriden, Conn., assignor to General Electric Company, a corporation of New York Application October 14, 1949, Serial No. 121,355

2 Claims. (Cl. 99—380)

My invention relates to a cooking device in the nature of a waffle iron, for baking a novel shape of waffle product. More particularly, my invention relates to a formation of grids and heating elements in waffle irons. Specifically, this invention is directed toward an improvement of one of the grids in a waffle iron so that a new shape of waffle may be effectively baked.

One of the objects of my invention is to provide a waffle iron which is relatively inexpensive and easy to manufacture although it is designed for baking a special shape of waffle. Another object of my invention is to provide a waffle iron utilizing natural heat convection for improving the quality of the product being baked. A further object is to provide a waffle iron for making waffles with up-standing rims, wherein provision is made for insuring the proper formation and baking of the rims.

Figure 1:
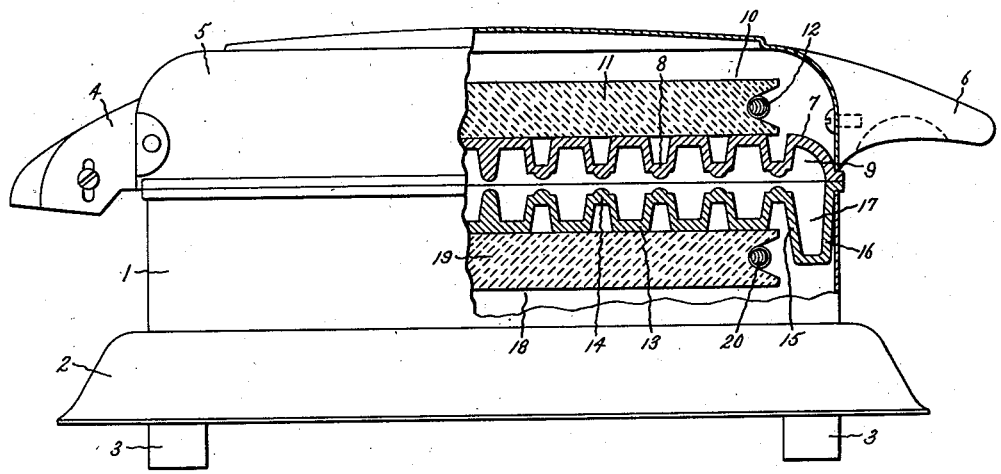
Figure 2:
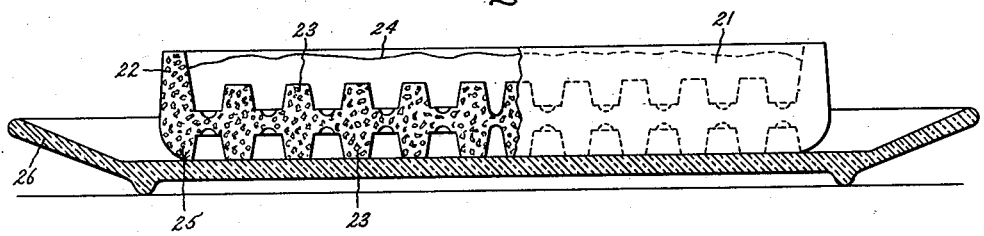

Other objects and the details of that which I believe to be novel and my invention will be clear from the following description and claims taken with the accompanying drawing in which is shown an example of waffle iron according to my invention incorporating the improved lower grid and heating element arrangement. In the drawing, Fig. 1 is a side view partly in section of a waffle iron according to my invention, and Fig. 2 is a sectional side views of a waffle made by a waffle iron according to my invention, showing its shape.

I have shown my invention as applied to a waffle iron of the electrically heated type, although it is obvious that other sources of heat might be used according to some aspects of the invention, and also it is shown as applied to such an iron having horizontal grids, whereas it is equally applicable to irons having grids otherwise arranged, vertically for example. In the example shown, the complete waffle iron includes a conventional outer lower shell 1, with an apron or base 2, carrying feet 3. Hinged to this lower shell by a conventional hinge connection 4 is an upper shell 5 which has the usual handle 6 for manipulating the upper shell between open and closed positions with respect to the lower shell.

Carried within the upper shell is an upper grid 7 which is provided with uniformly spaced bosses 8, these bosses being designed to produce the usual waffle pattern on the product which is being baked. It is also customary that the grid have a circumferential depression of about the same width and depth as the spaces between the bosses, and I have indicated this at 9 in the drawings.

The upper grid is heated by an electrical heating element 10, which is shown in the form of an inner insulating piece 11 of ceramic or other suitable material, which is surrounded by a coiled electrical resistance wire 12 of "nichrome" or other satisfactory material. The resistance wire is, of course, suitably connected to a source of electrical power in the usual fashion, as by a cord set, not shown.

Up to this point the waffle iron described is not different from conventional devices known before my invention. I desire to produce a waffle iron capable of making a waffle with an up-standing rim, so that the baked product can be filled with ice cream, jams, chicken a la king, crushed fruit or anything else the hungry heart might desire.

Several problems arise which must first be solved before satisfactory baking of a waffle of the desired shape can be accomplished. In the first place, it is desirable that the outer rim of the waffle always be of full depth and of complete extent around the waffle. Secondly, the addition of a rim around the waffle introduces the problem of properly baking such a rim so that it will be completely and evenly cooked. There is also the problem of possible sticking of the completed waffle to the baking grids. My invention presents solutions to all of these problems in the baking of the novel shape waffle.

In order to accomplish the desired effect, the lower grid 13, which matches the upper grid 7 in size and general shape, is provided with up-standing bosses 14 similar to those on the upper grid, but the lower grid is provided with a substantially vertical inner circumferential wall 15 and a substantially vertical outer circumferential wall 16 which form between them a circumferential depression or groove 17 around the outer edge of the lower grid. This annular depression or trough is of substantially greater depth than the depth of the bosses or nibs on the grid, and preferably approximately twice the depth of the bosses, as shown in the drawing. This depression is also about the same width or horizontal thickness as the space between the bosses, for best cooking results.

Below the lower grid is the lower heating element 18, shown as comprising an insulating support 19 surrounding an annular coiled wire resistance element 20. It will be noted that the vertical spacing of the resistance element 20 from the bottom of the lower grid proper is approximately the same as the horizontal spacing between this element and the inner wall of the depression or trough 17. This same spacing is continued around the whole waffle iron so that an even baking of the rim of the waffle is assured.

Suitable connection of the resistance 20 to a source of electrical power is made in any desirable fashion, as is customary.

In Fig. 2 I have shown a waffle 21 produced by the waffle iron of my invention. This waffle has an up-standing rim 22 and ridges 23. The outer rim is formed between the walls 15 and 16 which define the trough 17. The ridges 23 are formed within the spaces between the bosses 8 and 14. Within this dish-shaped waffle may be placed any sort of food 24 to supplement or enhance the baked product. The shallow lower outer rim 25 supports the deep rim 22 around the edge of the waffle when it is placed on a plate 26 and is, of course, formed within the annular depression 9 of the waffle iron.

The grids of a waffle iron according to my invention may be made of cast aluminum, iron, or other suitable material. It is a peculiarity of waffle irons of this type, having horizontal grids, that the waffle will usually tend to stick more to the upper grid than to the lower grid when the waffle iron is opened. This is perhaps due to the fact that the upper grid is never heated to quite the same extent as the lower grid because of heat losses. However, I take advantage of this peculiarity and place the depression for forming the deep rim in the lower grid, so that any possible increased sticking due to the increased depth of the waffle may be partially or wholly overcome by the natural tendency toward greater sticking in the upper grid.

It will also be noted that by placing the deep trough 17 in the lower grid, the force of gravity insures a flow of the semi-liquid batter first to this portion of the iron when the iron is being filled, so that a complete rim on the completed waffle will be assured. This would not be so if the rim depression were placed in the upper grid, where one would have to rely upon the raising of the batter during baking in order to produce the deep rim.

It will be noted that the heating element 20 is located within and surrounded and overhung by the walls 15 and 16 which form the depression 17. This effectively traps heat under the lower grid and further aids in uniform baking of the waffle proper and of the rim 22 of the waffle.

Although I have shown a waffle iron which by implication produces a waffle of round form, the waffle iron need not produce a product of this shape but may be designed to produce a waffle oblong, square, or any other shape desired. It is the rim around the completed waffle which is important, and the structure in the iron for producing this rim successfully.

As will be evident from the foregoing description, certain aspects of my invention are not limited to the particular details of construction of the example illustrated, and I contemplate that various and other modifications and applications of the invention will occur to those skilled in the art. It is, therefore, my intention that the appended claims shall cover such modifications and applications as do not depart from the true spirit and scope of my invention.

What I claim as new and desire to secure by Letters Patent of the United States is:

1. A waffle iron comprising a pair of opposing grids, said grids having a plurality of opposed spaced bosses, one of said grids having walls at its periphery defining an annular peripheral channel of a depth substantially equal to the depth of the bosses on that grid, and the other grid having walls defining a peripheral channel opposite said first named channel and having a depth considerably greater than that of the bosses on that grid so that the waffle cooked between said grids is formed within an upright peripheral rim, and means for heating said grids.

2. A waffle iron comprising a horizontal lower grid provided with a plurality of uniformly spaced upright bosses, an upper matching grid with corresponding bosses movable with respect to the lower grid, said lower grid having at its outer edge inner and outer substantially vertical walls forming between them a re-entrant circumferential depression around the outer edge of said lower grid of a depth substantially greater than the depth of said bosses on said grid and of a width substantially equal to the spacing between said bosses, means for heating said upper grid, and means for heating said lower grid mounted thereon within the space surrounded by said peripheral depression and including an insulating support and a heat generating conductor on said support located below said grid and extending continuously therearound inside said depression and positioned substantially equal distances from the bottom wall of said grid and the inner wall of said depression.

ALLAN M. YOUNG.

REFERENCES CITED

The following references are of record in the file of this patent:

UNITED STATES PATENTS

| Number | Name | Date |
|---|---|---|
| 1,729,662 | Guest | Oct. 1, 1929 |
| 1,742,945 | Banff | Jan. 7, 1930 |
| 1,947,124 | Clauss | Feb. 13, 1934 |
| 2,187,515 | Gerdan | Jan. 16, 1940 |